(12) United States Patent
See et al.

(10) Patent No.: US 12,060,285 B2
(45) Date of Patent: Aug. 13, 2024

(54) RAIN HEAD AND SCREEN THEREFOR

(71) Applicant: RAIN HARVESTING PTY LTD, Milton (AU)

(72) Inventors: Anton Lee See, Albion (AU); Shaun Crossman, Milton (AU); David John Anderson, West End (AU)

(73) Assignee: RAIN HARVESTING PTY LTD, Milton (AU)

( * ) Notice: Subject to any disclaimer, the term of this patent is extended or adjusted under 35 U.S.C. 154(b) by 114 days.

(21) Appl. No.: 17/447,963

(22) Filed: Sep. 17, 2021

(65) Prior Publication Data

US 2022/0402774 A1    Dec. 22, 2022

(30) Foreign Application Priority Data

Jun. 18, 2021   (AU) ................................ 2021204102

(51) Int. Cl.
| | | |
|---|---|---|
| *C02F 1/00* | (2023.01) | |
| *B01D 29/01* | (2006.01) | |
| *B01D 39/10* | (2006.01) | |
| *C02F 103/00* | (2006.01) | |
| *E03B 3/02* | (2006.01) | |
| *E04D 13/08* | (2006.01) | |

(52) U.S. Cl.
CPC ............ *C02F 1/001* (2013.01); *B01D 29/016* (2013.01); *B01D 39/10* (2013.01); *E03B 3/02* (2013.01); *E04D 13/08* (2013.01); *C02F 2103/001* (2013.01); *E04D 2013/086* (2013.01)

(58) Field of Classification Search
None
See application file for complete search history.

(56) References Cited

U.S. PATENT DOCUMENTS

| | | | | | |
|---|---|---|---|---|---|
| 60,005 | A | * | 11/1866 | Welker ................... | E04D 13/08 137/873 |
| 94,271 | A | * | 8/1869 | Ayres ..................... | E04D 13/08 137/873 |
| 97,160 | A | * | 11/1869 | Burleigh ................ | B01D 29/05 210/247 |
| 246,930 | A | * | 9/1881 | West ....................... | E03B 3/02 137/873 |
| 289,473 | A | * | 12/1883 | Van Tassel ............ | B01D 35/02 210/447 |

(Continued)

FOREIGN PATENT DOCUMENTS

WO    WO-2020142799 A1 *  7/2020

*Primary Examiner* — Robert J Popovics
(74) *Attorney, Agent, or Firm* — Greer, Burns & Crain, Ltd

(57) ABSTRACT

A rain head comprising a lower body, a screen and an upper body. The screen includes a frame having a trough or recess. Lower parts of the sidewalls of the upper body 14 can fit into the trough or recess to enable the upper body to be removably mounted to the rain head. The screen also includes a peripheral flange and a downwardly extending lip that enable the screen to be removably mounted to the upper part of the lower body. At least some water splashing off the screen during a rain event comes into contact with the upper body and is re-directed to flow into the lower body and out through the outlet of the lower body to a rainwater collection tank. The screen and upper body may be provided separately to the lower body.

8 Claims, 11 Drawing Sheets

(56) References Cited

U.S. PATENT DOCUMENTS

| | | | | | |
|---|---|---|---|---|---|
| 371,697 A * | 10/1887 | Miller | E03B 3/02 | | 210/495 |
| 458,768 A * | 9/1891 | Weightman | E04D 13/08 | | 137/873 |
| 520,993 A * | 6/1894 | Keller | E04D 13/0767 | | 210/162 |
| 522,667 A * | 7/1894 | Minnemeyer | B01D 35/02 | | 210/447 |
| 527,400 A * | 10/1894 | Barth | E03B 3/02 | | 137/873 |
| 541,183 A * | 6/1895 | Schermerhorn | B01D 35/02 | | 210/447 |
| 542,934 A * | 7/1895 | Kleespies | E03B 3/02 | | 137/583 |
| 543,922 A * | 8/1895 | Buckley | B01D 35/30 | | 210/314 |
| 571,776 A * | 11/1896 | Long | E04D 13/08 | | 210/405 |
| 617,032 A * | 1/1899 | Martin | B01D 35/02 | | 210/451 |
| 694,440 A * | 3/1902 | Stair | B01D 35/30 | | 210/451 |
| 752,547 A * | 2/1904 | Harris et al. | B01D 35/147 | | 210/411 |
| 899,568 A * | 9/1908 | Shepard | B01D 29/111 | | 210/163 |
| 939,838 A * | 11/1909 | Hensler | E03F 5/14 | | 52/12 |
| 971,578 A * | 10/1910 | Walker | E03B 3/02 | | 210/317 |
| 1,044,601 A * | 11/1912 | Thiem | B01D 35/02 | | 210/489 |
| 1,076,075 A * | 10/1913 | Steele | B01D 35/02 | | 210/447 |
| 1,136,538 A * | 4/1915 | Kuenzli | B01D 35/02 | | 210/433.1 |
| 1,177,174 A * | 3/1916 | Doty | B01D 35/147 | | 210/317 |
| 1,188,280 A * | 6/1916 | Kuenzli | B01D 35/02 | | 210/433.1 |
| 1,231,356 A * | 6/1917 | Houge | B04B 11/04 | | 4/DIG. 14 |
| 1,254,125 A * | 1/1918 | Dash | B01D 35/02 | | 210/433.1 |
| 1,265,772 A * | 5/1918 | Groo | B60T 17/006 | | 210/209 |
| 1,270,274 A * | 6/1918 | Dunn | B01D 36/001 | | 210/451 |
| 1,283,278 A * | 10/1918 | Ott | B01D 29/90 | | 210/433.1 |
| 1,333,127 A * | 3/1920 | Nall | B07B 4/08 | | 209/281 |
| 1,360,834 A * | 11/1920 | Wallace | B07B 7/06 | | 209/250 |
| 1,383,547 A * | 7/1921 | Konsalik | E04D 13/08 | | 210/314 |
| 1,532,013 A * | 3/1925 | Winans | B01D 24/22 | | 210/447 |
| 1,552,902 A * | 9/1925 | Werner | F16L 55/24 | | 210/446 |
| 1,559,941 A * | 11/1925 | Demaree | E03B 3/03 | | 210/422 |
| 1,653,473 A * | 12/1927 | Schulz | B01D 35/28 | | 210/433.1 |
| 1,817,376 A * | 8/1931 | Izquierdo | E03C 1/282 | | 4/256.1 |
| 1,892,039 A * | 12/1932 | Demaree | B01D 35/28 | | 210/433.1 |
| 2,090,997 A * | 8/1937 | French | E04D 13/08 | | 210/433.1 |
| 2,419,501 A * | 4/1947 | Pinto | E04D 13/08 | | 210/446 |
| 2,463,814 A * | 8/1948 | Skinner | D21F 1/66 | | 210/232 |
| 2,450,006 A * | 9/1948 | Lesniak | B01D 29/94 | | 210/348 |
| 2,494,780 A * | 1/1950 | Schmidt | E04D 13/0645 | | 210/162 |
| 2,532,388 A * | 12/1950 | Batt, Jr. | E04D 13/08 | | 210/447 |
| 2,872,041 A * | 2/1959 | Dreissen | B07B 1/00 | | 210/348 |
| 2,887,073 A * | 5/1959 | Thompson | E04D 13/08 | | 52/12 |
| 2,916,142 A * | 12/1959 | Fontein | B07B 1/00 | | 209/274 |
| 2,942,730 A * | 6/1960 | Fontein | B07B 1/00 | | 209/393 |
| 2,971,650 A * | 2/1961 | Miranda | E04D 13/08 | | 210/451 |
| 3,259,244 A * | 7/1966 | Kaljo | B07B 1/00 | | 209/281 |
| 3,344,919 A * | 10/1967 | Leeman | B07B 1/4681 | | 209/281 |
| 3,421,629 A * | 1/1969 | Hehr | E04D 13/08 | | 210/477 |
| 3,426,866 A * | 2/1969 | Jensen | F16L 55/033 | | 239/553.3 |
| 3,465,885 A * | 9/1969 | Trump | E04D 13/08 | | 210/447 |
| 3,628,668 A * | 12/1971 | Huppert | E04D 13/08 | | 52/12 |
| 3,788,484 A * | 1/1974 | Godin | B01D 29/96 | | 210/470 |
| 3,813,298 A * | 5/1974 | Chwalek | C08B 30/044 | | 209/234 |
| 3,956,133 A * | 5/1976 | Arnold | E04D 13/08 | | 210/232 |
| 4,097,382 A * | 6/1978 | Cruea | B01D 35/28 | | 209/264 |
| 4,120,790 A * | 10/1978 | Tinker | B01D 35/28 | | 209/267 |
| 4,183,368 A * | 1/1980 | Husted | E04D 13/076 | | 52/16 |
| 4,202,777 A * | 5/1980 | Schall | B01D 35/28 | | 210/405 |
| 4,250,024 A * | 2/1981 | Soares | B01D 35/28 | | 209/250 |
| 4,376,053 A * | 3/1983 | Bullock | A01J 5/0134 | | D23/209 |
| 4,447,325 A * | 5/1984 | Pauley | B01D 29/118 | | 210/295 |
| 4,460,469 A * | 7/1984 | Francesconi, Jr. | B01D 35/02 | | 210/470 |
| 4,470,908 A * | 9/1984 | Odekirk | B01D 35/00 | | 210/463 |
| 4,472,274 A * | 9/1984 | Williams | B01D 29/945 | | D23/209 |
| 4,523,875 A * | 6/1985 | DiFiore | E03F 1/002 | | 52/12 |
| 4,615,153 A * | 10/1986 | Carey | E04D 13/08 | | 52/12 |
| D288,840 S * | 3/1987 | Williams | D23/261 | | |
| 4,798,028 A * | 1/1989 | Pinion | E04D 13/08 | | 52/16 |
| 4,801,377 A * | 1/1989 | Bolt | B01D 29/945 | | 52/12 |
| 4,997,566 A * | 3/1991 | Davis | B01D 29/46 | | 209/677 |
| 5,119,849 A * | 6/1992 | Hinkley | E04D 13/08 | | 134/201 |
| 5,230,798 A * | 7/1993 | Rogman | B01D 29/96 | | 52/12 |
| D354,552 S * | 1/1995 | Weber | D23/261 | | |
| 5,406,966 A * | 4/1995 | Lepkowski | E04D 13/08 | | 210/162 |
| 5,451,315 A * | 9/1995 | Miller | E21F 13/04 | | 299/8 |

(56) References Cited

U.S. PATENT DOCUMENTS

| | | | | |
|---|---|---|---|---|
| 5,452,546 A * | 9/1995 | Goddard | E04D 13/08 | 210/170.03 |
| 5,522,427 A * | 6/1996 | Johnson | E04D 13/08 | 137/616.5 |
| 5,526,612 A * | 6/1996 | Wade | E04D 13/0645 | 52/12 |
| 5,624,038 A * | 4/1997 | Curtis | B07B 1/04 | 209/412 |
| 5,709,051 A * | 1/1998 | Mazziotti | E04D 13/08 | 52/12 |
| 5,882,508 A * | 3/1999 | St-Jacques | E03F 1/002 | 210/170.03 |
| 5,985,158 A * | 11/1999 | Tiderington | B01D 29/35 | 52/12 |
| 6,024,127 A * | 2/2000 | Johnson | E04D 13/08 | 52/16 |
| 6,095,338 A * | 8/2000 | Connolly | B07B 1/4681 | 209/274 |
| 6,219,972 B1 * | 4/2001 | Zusy | E04D 13/076 | 52/12 |
| 6,263,618 B1 * | 7/2001 | Jones | E04D 13/0767 | 52/12 |
| 6,497,816 B2 * | 12/2002 | Naddy | B01D 29/336 | 52/12 |
| 6,705,049 B2 * | 3/2004 | Esmond | E04D 13/08 | 210/162 |
| 6,936,164 B2 * | 8/2005 | Wade | B01D 33/466 | 52/12 |
| 7,128,834 B2 * | 10/2006 | Davenport | B01D 35/02 | 4/DIG. 14 |
| 7,141,158 B2 * | 11/2006 | Hong | E04D 13/0645 | 52/12 |
| D553,226 S * | 10/2007 | Wisek | D23/268 | |
| D575,853 S * | 8/2008 | Adamson | D23/267 | |
| 7,550,077 B2 * | 6/2009 | Graf | E03B 3/02 | 52/12 |
| 7,584,577 B2 * | 9/2009 | Esmond | E04D 13/08 | 52/12 |
| D616,970 S * | 6/2010 | Block | D23/267 | |
| 7,780,013 B1 * | 8/2010 | Kern | E03B 9/16 | 137/550 |
| 7,805,890 B2 * | 10/2010 | Esmond | E04D 13/08 | 52/12 |
| 7,895,793 B1 * | 3/2011 | Yates | E04D 13/08 | 52/12 |
| 7,919,002 B1 * | 4/2011 | Hurtado | E04D 13/08 | 210/170.03 |
| 8,006,720 B1 * | 8/2011 | Kotansky | E04D 13/08 | 52/16 |
| 8,033,058 B2 * | 10/2011 | Block | E04D 13/08 | 52/12 |
| 8,088,079 B2 * | 1/2012 | Kaye | A61B 10/0283 | 600/562 |
| 8,097,151 B2 * | 1/2012 | Allan | E03F 1/002 | 52/12 |
| 8,136,304 B2 * | 3/2012 | Sternbach | E04D 13/064 | 52/12 |
| 8,272,170 B2 * | 9/2012 | Argentina | E04D 13/0645 | 52/12 |
| 8,404,110 B2 * | 3/2013 | Block | E04D 13/08 | 52/12 |
| 8,438,788 B2 * | 5/2013 | Bell | E04D 13/08 | 52/12 |
| 8,475,654 B1 * | 7/2013 | Smith | E04D 13/08 | 210/170.03 |
| 8,517,047 B2 * | 8/2013 | Teoh | E04D 13/08 | 210/170.03 |
| 8,528,263 B2 * | 9/2013 | Schmidt | E04D 13/08 | 52/16 |
| 8,578,976 B1 * | 11/2013 | Davis | E03B 3/03 | 52/12 |
| 8,656,947 B1 * | 2/2014 | Barton | E04D 13/08 | 210/170.03 |
| 8,715,495 B1 * | 5/2014 | Smith | E04D 13/0767 | 210/170.03 |
| 9,038,320 B1 * | 5/2015 | Deakins | E04D 13/08 | 52/12 |
| 9,080,328 B1 * | 7/2015 | Smith | E04D 13/08 | |
| 9,260,321 B2 * | 2/2016 | Garios | E03B 1/041 | |
| 9,416,543 B1 * | 8/2016 | Fox | E04D 13/0767 | |
| 9,440,316 B2 * | 9/2016 | McIntosh | B23P 6/00 | |
| D786,411 S * | 5/2017 | Kerr | D23/268 | |
| 9,732,526 B2 * | 8/2017 | Denk | E04D 13/08 | |
| 10,000,933 B2 * | 6/2018 | Kerr | B01D 29/05 | |
| 10,435,875 B2 * | 10/2019 | Kimberley | E03C 1/264 | |
| 11,066,798 B2 * | 7/2021 | Paczek | E02B 5/085 | |
| 11,117,076 B2 * | 9/2021 | Neumann | B01D 39/10 | |
| 11,260,325 B2 * | 3/2022 | Dai | C02F 1/004 | |
| 11,471,796 B1 * | 10/2022 | Sherwood | B01D 35/30 | |
| D973,850 S * | 12/2022 | Lin | D23/260 | |
| 11,877,573 B2 * | 1/2024 | Friezner | E03F 1/002 | |
| D1,018,793 S * | 3/2024 | Sherwood | D23/267 | |
| 2001/0030149 A1 * | 10/2001 | Naddy | E04D 13/0767 | 210/162 |
| 2002/0050473 A1 * | 5/2002 | Davenport | E03C 1/264 | 210/447 |
| 2003/0051414 A1 * | 3/2003 | Bessette | E04D 13/08 | 52/16 |
| 2003/0167700 A1 * | 9/2003 | Esmond | E04D 13/08 | 52/12 |
| 2004/0031209 A1 * | 2/2004 | Porter | E04D 13/08 | 52/12 |
| 2004/0144703 A1 * | 7/2004 | Davenport | E03C 1/264 | 210/447 |
| 2005/0109693 A1 * | 5/2005 | Allard | B01D 35/02 | 210/162 |
| 2005/0144852 A1 * | 7/2005 | Hong | E04D 13/0767 | 52/12 |
| 2005/0246967 A1 * | 11/2005 | Esmond | E04D 13/08 | 52/16 |
| 2007/0191731 A1 * | 8/2007 | Kaye | A61B 10/0283 | 600/565 |
| 2008/0086953 A1 * | 4/2008 | Graf | E03B 3/02 | 52/12 |
| 2009/0236273 A1 * | 9/2009 | Esmond | E04D 13/08 | 210/155 |
| 2010/0270219 A1 * | 10/2010 | Block | E04D 13/08 | 210/162 |
| 2011/0041416 A1 * | 2/2011 | Schmidt | E04D 13/08 | 52/16 |
| 2011/0100887 A1 * | 5/2011 | Balistreri | E04D 13/08 | 210/170.03 |
| 2011/0203191 A1 * | 8/2011 | Argentina | E04D 13/0645 | 52/12 |
| 2011/0226350 A1 * | 9/2011 | Russell | E04D 13/08 | 137/561 A |
| 2011/0290355 A1 * | 12/2011 | Teoh | E03B 3/03 | 137/561 R |
| 2011/0303307 A1 * | 12/2011 | Block | E04D 13/08 | 137/357 |
| 2012/0210652 A1 * | 8/2012 | Seitz | E04D 13/08 | 52/12 |
| 2013/0233443 A1 * | 9/2013 | Kuehneman | F16L 55/24 | 141/69 |
| 2016/0017610 A1 * | 1/2016 | Denk | E04D 13/08 | 210/170.03 |
| 2017/0211277 A1 * | 7/2017 | Kerr | E03B 3/02 | |
| 2020/0078711 A1 * | 3/2020 | Neumann | C02F 1/001 | |
| 2021/0024377 A1 * | 1/2021 | Cochrane | B01J 20/28016 | |
| 2021/0387115 A1 * | 12/2021 | Neumann | C02F 1/001 | |
| 2022/0167609 A1 * | 6/2022 | Friezner | E03F 5/041 | |
| 2022/0251819 A1 * | 8/2022 | Friezner | E03F 5/107 | |
| 2022/0402774 A1 * | 12/2022 | See | E03B 3/02 | |
| 2023/0302385 A1 * | 9/2023 | Sherwood | B01D 29/96 | |
| 2023/0358050 A1 * | 11/2023 | Sutton | E04D 13/08 | |

* cited by examiner

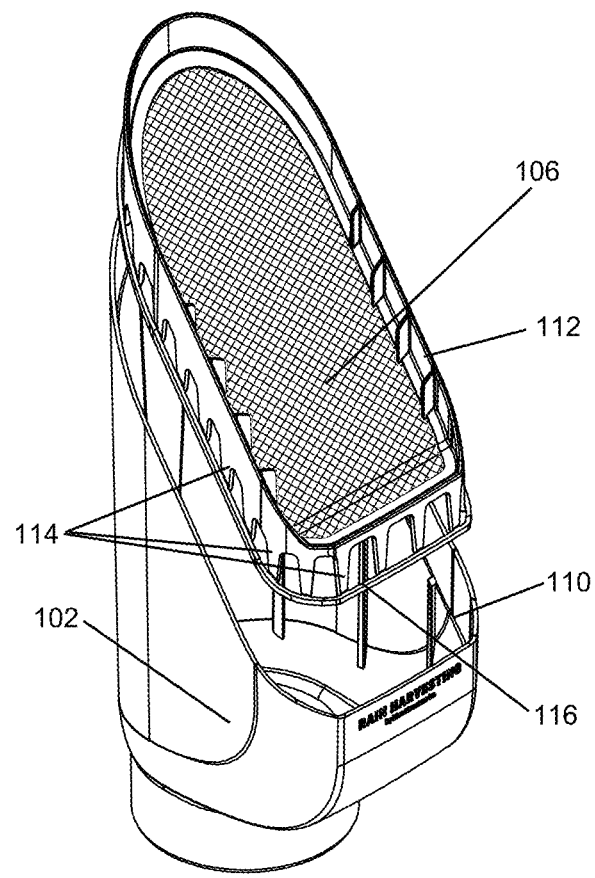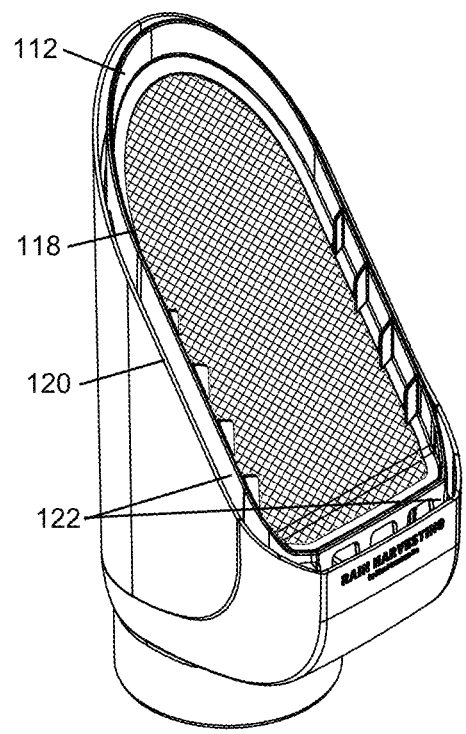
FIGURE 15
FIGURE 16

RAIN HEAD AND SCREEN THEREFOR

BACKGROUND

The present invention relates to a rain head and a screen therefor.

Rain heads are frequently used in conjunction with water harvesting systems for collecting water from the roofs of buildings. Such water harvesting systems typically include water tanks that receive water collected on the roof, first flush diverters for collecting a dirty first flush of rainwater from the roof and appropriate strainers for straining the rainwater before it enters the rainwater tank. The strainers prevent or minimise the amount of leaves and other debris that passes into the tank, thereby maintaining water quality tank. Any openings in direct fluid communication with the rainwater tank should also ideally have an insect screen to prevent mosquitoes and other insects from entering the rainwater tank.

Over time, leaves and other debris can build up on the roof and roof gutters. When the next rain event occurs, the leaves and other debris are washed into the downpipes. The leaves and debris have the potential to block first flush diverters and strainers fitted to water tanks.

To avoid this difficulty, rain heads have been developed. Rain heads typically include a screen through which water collected from the roof flows. The screen collects large debris and leaves from the water and prevents the large debris and leaves from further passage through the water collection system. The screen may be angled to the horizontal so that the leaves and large debris tend to get washed off the screen. Rain heads are typically mounted below a gutter outlet or a downpipe with the rain head being spaced from the gutter outlet or downpipe. The gap between the gutter outlet or downpipe and the rain head allows leaves to be removed from the rain head and also facilitates maintenance or cleaning the rain head.

Rain heads can readily become blocked if not cleaned at relatively short intervals. Once a rain head becomes blocked, water which would otherwise be collected in the rainwater tank is lost. Further, once leaves start to build up on the screen of the rain head, water falling on the rain head can splash off and away from the rain head via the gap between the rain head and the downpipe or gutter outlet. This represents a loss of water.

It will be clearly understood that, if a prior art publication is referred to herein, this reference does not constitute an admission that the publication forms part of the common general knowledge in the art in Australia or in any other country.

SUMMARY

The present invention is directed to a rain head and a screen therefore, which may at least partially overcome at least one of the abovementioned disadvantages or provide the consumer with a useful or commercial choice.

With the foregoing in view, the present invention in one form, resides broadly in a rain head comprising a lower body for fitting to a downpipe, the lower body having a passage therethrough so that rainwater can flow through the lower body and into the downpipe, and an upper body, the upper body having an opening in a bottom part, a top opening through which an upper downpipe can extend, the upper body having at least one downwardly extending sidewall, wherein at least some water splashing in the rain head contacts the downwardly extending sidewall(s) of the upper body and the water is directed towards the passage in the lower body of the rain head.

In one embodiment, the upper body comprises a removable upper body. The upper body may be removably mounted or removably positioned. The upper body may comprise a hood.

In one embodiment, the lower body has sidewalls an open top, and a lower opening for fitting to a downpipe. The lower opening is suitably sized such that it can fit inside an upper opening of the downpipe. The lower body of the rain head may be provided with one or more ribs to provide additional strength thereto.

In one embodiment, the lower body has an upper edge, with the upper edge sloping downwardly from a rear side wall towards a front side wall. It will be appreciated that the upper edge of the lower body is defined by the upper edges of the sidewalls of the lower body.

In one embodiment, the rain head includes a screen. The screen will include a mesh or a strainer having apertures therein, the mesh or strainer preventing flow of leaves and debris of size larger than an opening size of the apertures from flowing through the mesh or strainer.

In one embodiment, the screen comprises the mesh or strainer surrounded by a frame. In one embodiment the frame has a peripheral flange that can rest on the upper edge of the lower body. In one embodiment, the peripheral flange has a downwardly extending outer lip extending at least part way around the peripheral flange. The downwardly extending outer lip overlies an upper portion of one or more sidewalls of the lower body when the screen is mounted to the lower body. This assists in positioning the screen on the lower body and more securely holding the screen on the lower body. The downwardly extending lip may overlie at least 2, or preferably at least 3 sidewalls of the lower body. In another embodiment, the peripheral flange can be in the form of a plurality of spaced peripheral flanges or a plurality of generally horizontally extending tabs.

In another embodiment, the peripheral flange has a downwardly extending wall or projection extending from an inner part of the flange, the downwardly extending wall or projection being spaced from the downwardly extending outer lip, wherein a space between the downwardly extending outer lip and the downwardly extending wall or projection extending from the inner part of flange can receive the upper edge of the lower body or can be fitted over the upper edge of the lower body of the rain head. Again, this assists in locating the screen on the lower body. In one embodiment, the downwardly extending outer lip and the downwardly extending wall or projection extending from the inner part of the flange can be replaced by respective pluralities of downwardly extending ribs or tabs spaced from each other.

In one embodiment, the screen has a wall or edge that is spaced from a wall of the lower body such that a space is defined between the wall or edge of the screen and the wall of the lower body and the upper body has a lower edge that is positioned in the space when the upper body is fitted to the rain head. In one embodiment, the lower body has one or more projections that support the screen when the screen is fitted to the lower body. The one or more projections may comprise a plurality of ribs or tabs, or a flange. The plurality of ribs or tabs may be inwardly projection ribs or tabs. The flange may be an inwardly projecting flange. The upper body may rest on the screen or the screen may be provided with one or more projections or one or more outwardly extending walls that support the upper body. In one embodiment, a lower part of the screen fits inside an upper part of the lower body.

In one embodiment, the screen is provided with a trough or recess or a slot. The trough or recess or slot may be formed in the frame and may suitably extend around and encircle the mesh or screen. The trough or recess or slot can receive a lower edge of the upper body to enable the upper body to be removably mounted to the rain head. In this embodiment, the screen is mounted to the lower body and the upper body is then mounted to the screen to form the fully assembled rain head.

In one embodiment, the screen is removably mounted to the lower body and the upper body is removably mounted to the screen.

In one embodiment, the trough or recess comprises the downwardly extending wall or projection extending from the inner part of the flange, an inwardly extending portion extending inwardly from a lower part of the downwardly extending wall or projection and an upwardly extending portion extending from an inner part of the inwardly extending portion. The trough or recess they have a generally U-shaped cross-section.

In one embodiment, the trough or recess has openings in a lower part thereof to enable water to flow or drain therethrough.

In one embodiment, the trough or recess is defined by a plurality of spaced U-shaped projections. The space between adjacent U-shaped projections allows water to drain therethrough.

In one embodiment, the width of the trough or recess is larger than a thickness of the lower edge of the upper body. In this embodiment, the lower edge of the upper body can fit into the trough or recess. In one embodiment, when the upper body is fitted to the trough or recess, the gap between the upper body and the top of the trough or recess is small enough to prevent egress by mosquitoes. In another embodiment, the upper body may be provided with an outlet extending projection that, in use, acts as a cover for the gap between the trough or recess of the screen and the sidewalls of the upper body. Again, this assists in preventing egress of mosquitoes into the rain head.

In one embodiment, the screen has an angled upper portion extending on a first angle and a lower portion extending at a lesser angle than the upper portion, or the lower portion extending in a generally horizontal direction. By providing the screen with the angled upper portion, leaves and debris that fall onto the angled upper portion tend to be washed downwardly towards the lower portion of the screen by falling rainwater, thereby assisting in self-cleaning the upper portion of the screen.

In one embodiment, the upper body has a rear side wall that is shorter than a front side wall, with the side sidewalls of the upper body having lower edges that slope downwardly from the rear side wall to the front side wall. This is done so that the lower edge of the upper body follows the general contour of the bottom of the trough or recess of the screen. Further, as the rear side wall is shorter, the upper body can be angled to enable the rear side wall to fit into the gap between the screen or the lower body of the rain head and the lower end of the upper downpipe. Once the rear wall has been inserted through that gap, the upper body can be moved upwardly so that the opening in the top of the upper body extends around the downpipe and oriented to its in-use position. This facilitates both installation of the upper body and removal of the upper body for servicing, maintenance or replacement of the upper body and/or screen and/or lower body. Once the upper body has been removed, the screen can also be easily removed by simply lifting it up from the lower body.

In one embodiment, the upper body comprises a splash guard. In one embodiment, the upper body comprises a hood. In one embodiment, the upper body has an open top and closed side walls. In another embodiment, the upper body has an opening located near the screen, in use. In this embodiment, easy access to the screen is provided for ease of cleaning or removing debris from the screen, but at the expense of higher water losses. This embodiment is particularly useful for use with rain heads used in high leaf load locations.

In one embodiment, the upper body has a roof, an opening in the roof that can fit over a lower part of an upper downpipe and encircling side walls. In another embodiment, the upper body has an open top and encircling sidewalls. In another embodiment, one or more of the sidewalls of the upper body may have one or more openings therein. In another embodiment, the upper body may have an open side, for example, the upper body may have 2 or 3 side walls only.

In a second aspect, the present invention provides a screen for a rain head, the screen comprising a mesh or a strainer having apertures therein, the mesh or strainer preventing flow of leaves and debris of size larger than an opening size of the apertures from flowing through the mesh or strainer, a frame surrounding the mesh or strainer, a trough or recess or slot in the screen, the trough or recess or slot being adapted to receive a lower edge of an upper body to thereby position the upper body relative to the screen.

The screen is provided with the trough or recess or slot. The screen may have a frame surrounding the mesh or strainer and the trough or recess or slot may be formed in the frame and may suitably extend around and encircle the mesh or screen. The trough or recess or slot can receive a lower edge of the upper body to enable the upper body to be removably mounted to the screen. In this embodiment, the screen can be mounted to the lower body of the rain head of the first aspect of the invention and the upper body is then mounted to the screen to form the fully assembled rain head.

In one embodiment, the trough or recess or slot has openings in a lower part thereof to enable water to flow or drain therethrough.

In one embodiment the frame has a peripheral flange that can rest on the upper edge of the lower body. In one embodiment, the peripheral flange has a downwardly extending outer lip extending at least part way around the peripheral flange. The downwardly extending outer lip overlies an upper portion of one or more sidewalls of the lower body when the screen is mounted to the lower body. This assists in positioning the screen on the lower body and more securely holding the screen on the lower body. The downwardly extending lip may overlie at least 2, or preferably at least 3, sidewalls of the lower body.

In another embodiment, the peripheral flange has a downwardly extending wall or projection extending from an inner part of the flange, the downwardly extending wall or projection being spaced from the downwardly extending outer lip, wherein a space between the downwardly extending outer lip and the downwardly extending wall or projection extending from the inner part of flange can receive the upper edge of the lower body or can be fitted over the upper edge of the lower body of the rain head. Again, this assists in locating the screen on the lower body. In one embodiment, the downwardly extending outer lip and the downwardly extending wall or projection extending from the inner part of the flange can be replaced by respective pluralities of downwardly extending ribs spaced from each other.

In one embodiment, the screen is removably mounted to the lower body of the rain head and the upper body is removably mounted to the screen.

In one embodiment, the trough or recess comprises the downwardly extending wall or projection extending from the inner part of the flange, an inwardly extending portion extending inwardly from a lower part of the downwardly extending wall or projection and an upwardly extending portion extending from an inner part of the inwardly extending portion. The trough or recess they have a generally U-shaped cross-section.

In one embodiment, the width of the trough or recess is larger than a thickness of the lower edge of the upper body. In this embodiment, the lower edge of the upper body can fit into the trough or recess. In one embodiment, when the upper body is fitted to the trough or recess, the gap between the upper body and the trough or recess is small enough to prevent egress by mosquitoes.

In one embodiment, the screen has an angled upper portion extending on a first angle and a lower portion extending at a lesser angle than the upper portion, or the lower portion extending in a generally horizontal direction. By providing the screen with the angled upper portion, leaves and debris that fall onto the angled upper portion tend to be washed downwardly towards the lower portion of the screen, thereby assisting in self-cleaning the upper portion of the screen.

The mesh or strainer may comprise a steel mesh or a stainless steel mesh. In other embodiments, the mesh or strainer may be moulded in place to form the appropriate-sized openings, or the strainer or mesh may comprise an embedded piece of plastic mesh material, such as nylon mesh, or other plastic or metal mesh, such as aluminium mesh. The apertures may have an opening of any desired size that is necessary to meet the operational requirements or regulatory requirements of the screen. In some embodiments, the mesh has a maximum opening size of less than 1 mm, such as 0.955 mm, in order to prevent mosquitoes from passing through the openings. Smaller opening sizes may be used. If mosquito resistance is not required, larger openings may also be used.

In the rain head of the first aspect of the present invention, when falling rainwater from the downpipe or gutter strikes the screen or the lower body, splashing can occur. In existing rain heads, water that splashes can pass out through the gap or space between the bottom of the upper downpipe and the rain head and thereafter fall onto the ground. This represents a loss of water. Further, this can also wet the ground beneath the rain head and this can lead to slippery ground conditions, which can be an occupational health and safety issue. In the rain head of the present invention, at least some of the water that splashes off the screen or off the lower body will come into contact with the inner surface of the upper body and then run down the side walls of the upper body and into the lower body. This minimises the loss of water and minimises additional wetting of the ground due to splashing from the rain head. When it is necessary to clean or service the rain head, the upper body can simply be moved upwardly so that the opening in the top of the upper body slides upwardly over the downpipe to provide access to the rain head. The upper body can be easily removed from the rain head. In embodiments where the rain head also includes the screen, the screen can also be easily removed for cleaning, servicing or replacement. In preferred embodiments, the rain head of the present invention has a screen that includes the trough or recess, with the trough or recess facilitating positioning and mounting of the upper body in the rain head.

In some embodiments, the upper body may comprise a sheet of material. In some embodiments, the upper body comprises a splash guard.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 15 shows the screen being inserted into the lower body in the rain head of FIG. 13;

FIG. 16 shows the screen fitted to the lower body of the rain head;

DETAILED DESCRIPTION

Figure 1:
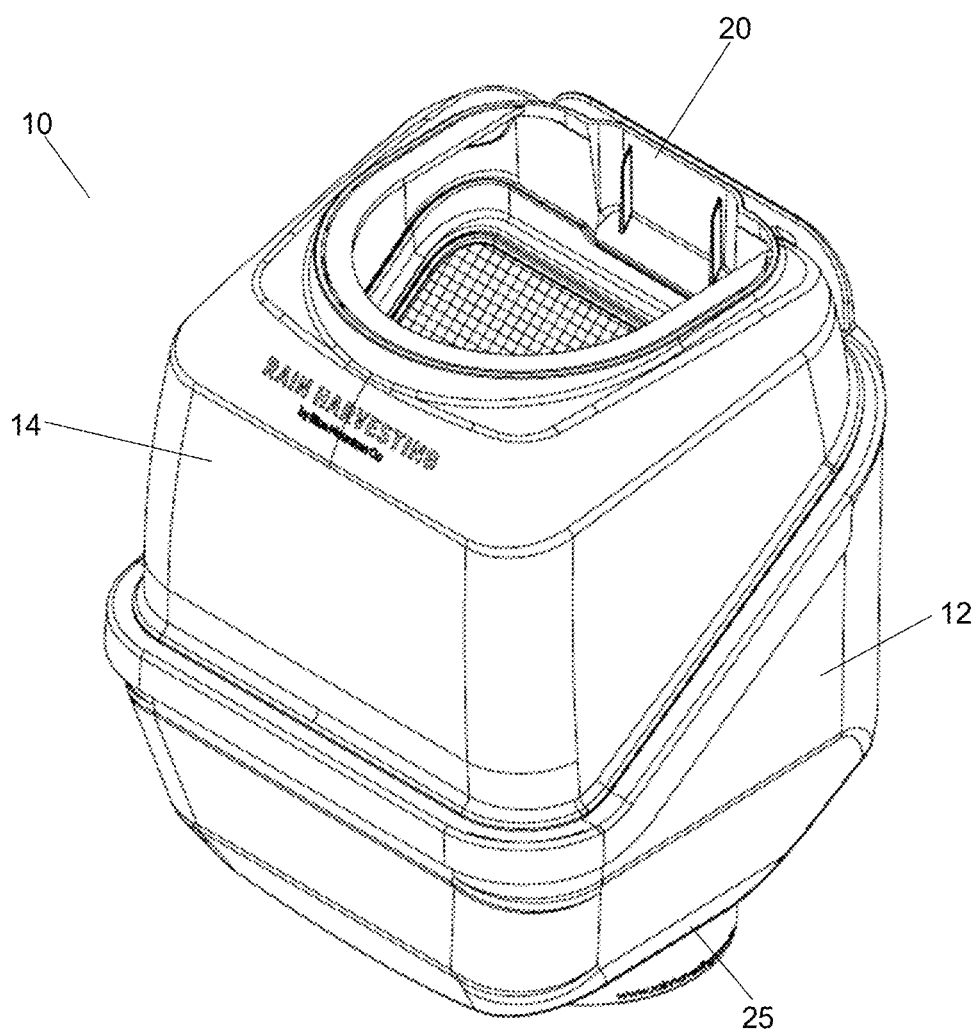
FIG. 1 shows a front perspective view of a fully assembled rain head in accordance with one embodiment of the present invention.
Figure 2:
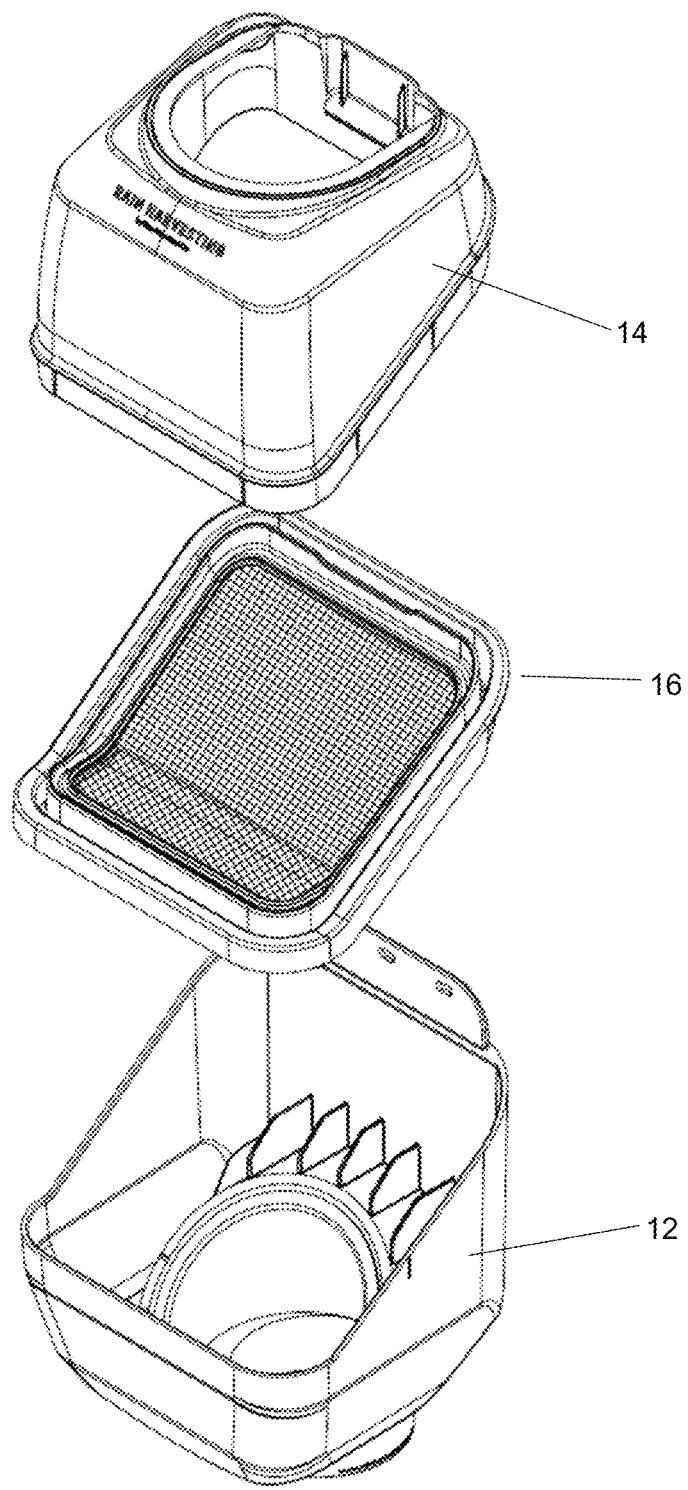
FIG. 2 shows the rain head of FIG. 1 apart and in-line for assembly, so that each component of the rain head can be seen.
Figure 3:
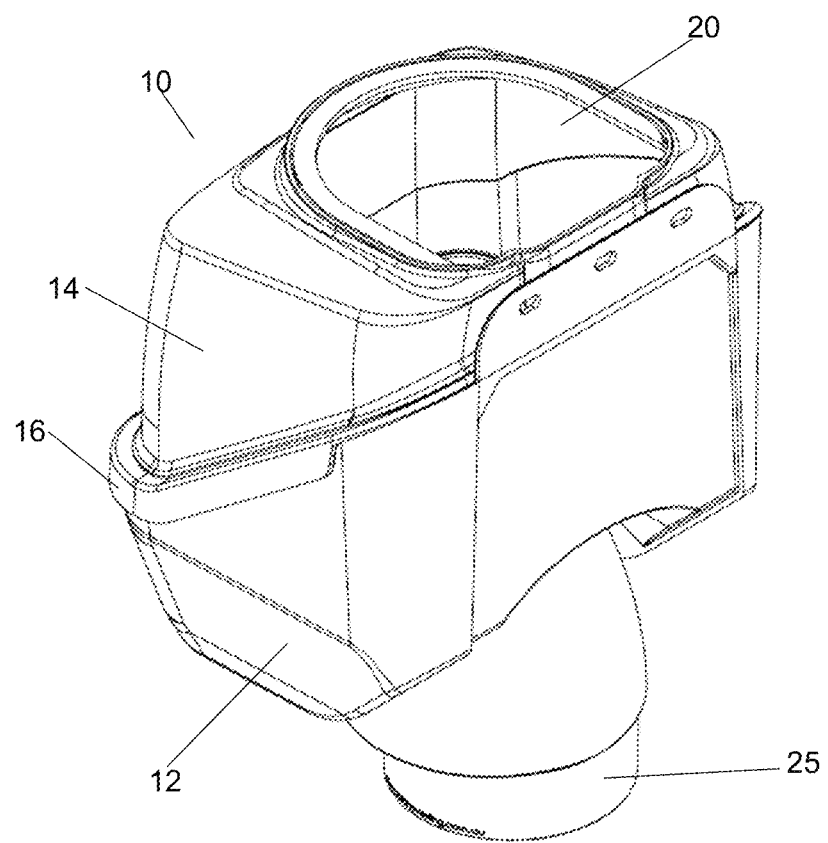
FIG. 3 shows a rear perspective view of the rain head shown in FIG. 1.

The drawings have been provided for the purposes of illustrating preferred embodiments of the present invention. Therefore, it will be understood that the present invention should not be considered to be limited solely to the features as shown in the drawings.

FIG. 1 shows a perspective view of a fully assembled rain head 10 in accordance with the present invention. The rain had 10 includes a lower body 12, an upper body in the form of a hood 14 and a screen 16. The lower body 12 includes an outlet pipe 25 having a lower opening 18 that can be connected to fit inside an upper part of a lower downpipe to thereby direct water flowing through the rain head 10 into the lower downpipe. The hood 14 includes a top opening 20 that is sized so that it can slide upwardly over an upper downpipe. In this regard, the top opening 20 is larger than the outer diameter of the upper downpipe. In the fully assembled position, the top opening 20 in the hood 14 sits above a lower end of an upper downpipe so that the opening of the upper downpipe is located below the level of the top opening 20.

In order to assemble the rain head 10 into the downpipe of the building, a gap or space is formed between an upper downpipe and a lower downpipe. This may be achieved by cutting an appropriately sized section of downpipe out of the downpipe. The lower opening 18 of the outlet pipe 25 of the lower body 12 is fitted into the upper part of the lower downpipe. The lower opening 18 of the lower body 12 is suitably glued into the lower downpipe. The screen 16 is then placed on the lower body, as will described in more detail hereunder. The hood 14 is then tilted so that the rear wall can fit through the gap between the lower body 12/screen 16, and the lower end of the upper downpipe. Once the rear wall of the hood 20 has been passed into that gap or space, the hood 20 can be manipulated so that the top opening 20 slides upwardly along the upper downpipe and the hood is re-oriented and then lowered so that the lower edges of the hood 14 are positioned in the trough or recess of the screen 16 and are held in position by the screen 16, as will described in greater detail hereunder.

Figure 5:
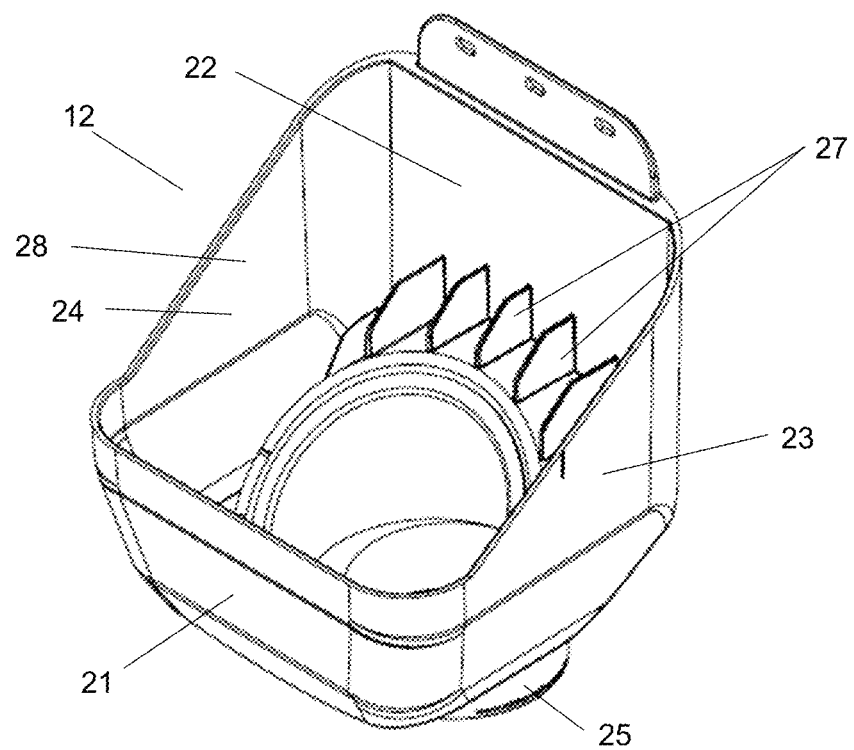
FIG. 5 shows a perspective view of the lower body of the rain head shown in FIG. 1.
Figure 6:
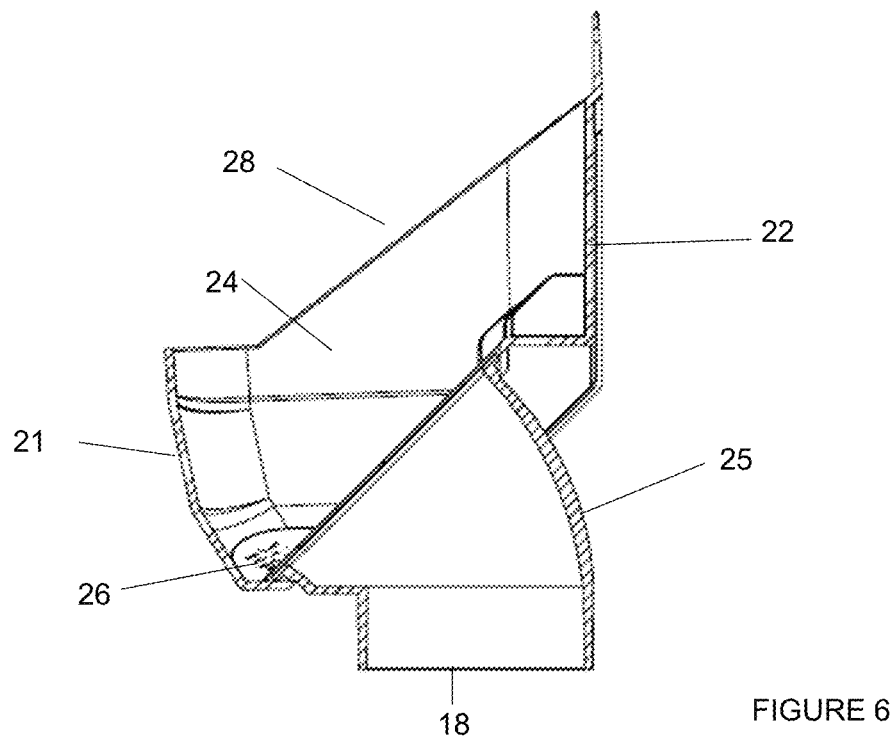
FIG. 6 shows a side cross-sectional view of the lower body shown in FIG. 5.

FIGS. 5 and 6 show further views of the lower body 12. The lower body 12 has four sidewalls joined through arcuate corners. The four sidewalls comprise front sidewall 21 rear sidewall 22, side sidewall 23 and side sidewall 24. The lower body 12 also has an outlet pipe 25 that includes the lower opening 18. The outlet pipe 18 opens to a floor 26 of the lower body. A series of ribs, some of which are numbered at 27, extend between the rear wall 22 and the top upper part of outlet pipe 25 to provide additional strength to the lower body 12. As can be seen from FIGS. 5 and 6, the lower body 12 has an open top 28. The lower body 12 provides a flow passage between the open top 28 and the lower opening 18 of the outlet pipe 25.

Figure 7:
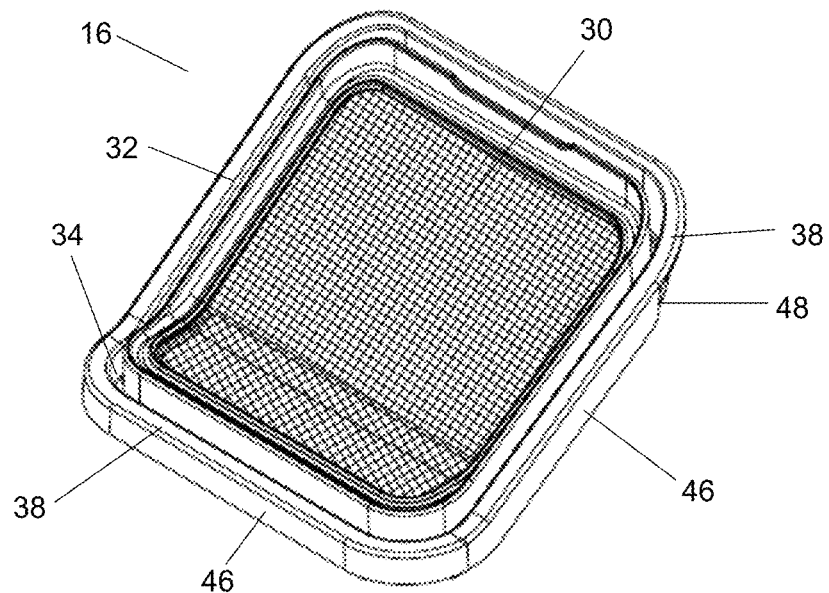
FIG. 7 shows a perspective view of the screen used in the rain head shown in FIG. 1.
Figure 8:
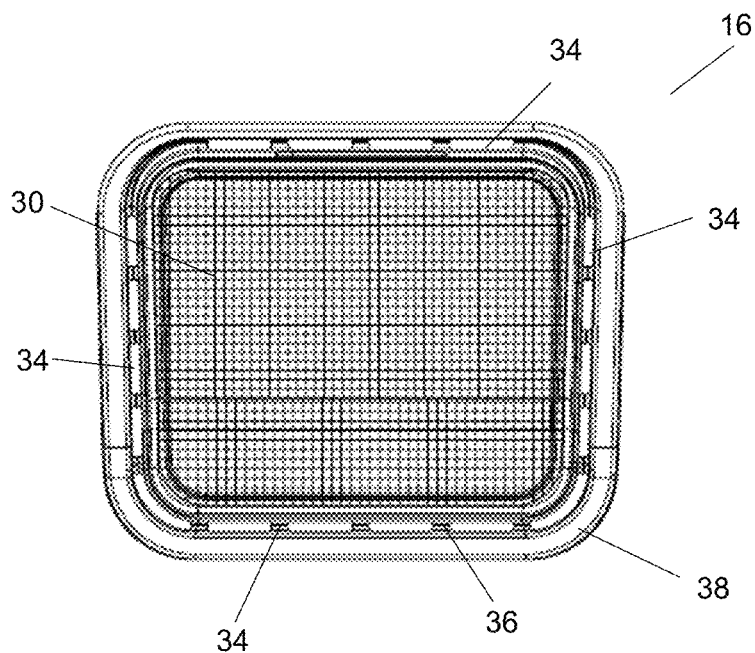
FIG. 8 shows a plan view of the screen shown in FIG. 7.
Figure 9:
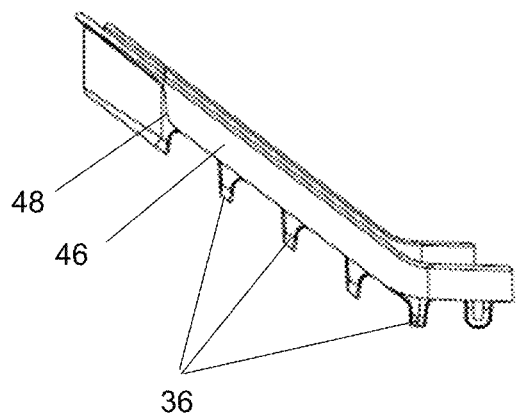
FIG. 9 shows a side view of the screen shown in FIG. 7.

FIGS. 7, 8 and 9 show further detail of the screen 16. Screen 16 includes a mesh 30 and a frame 32 that surrounds the mesh 30. The frame 30 may be made from moulded plastic and the mesh 30 may be a stainless-steel mesh. The mesh suitably has an aperture opening size that is sufficiently small to prevent mosquitoes from passing through the mesh. This will, of course, also result in leaves and larger debris being retained by the mesh 30.

The screen 16 includes a trough or recess 34 that can receive the lower edge of the hood 14 to thereby positioned the hood 14 in the rain head 10. The trough or recess 34 is formed in the frame 32. As can be seen from FIGS. 7 and 8, the trough or recess 34 extends around and surrounds the mesh 30. The upper opening of the trough or recess 34 forms a slot. The trough or recess 34 is formed by a plurality of spaced U-shaped members that are moulded into the frame. Some of these projections are numbered at 36 in FIGS. 8 and 9. It will be appreciated that the trough or recess 34 may also be provided with significantly more extensive side wall portions although the trough or recess may be in the form of a generally U-shaped trough or recess having extensive or continuous sidewalls.

The trough or recess 34 has a slot-like top opening that is sufficiently wide to receive the lower edge of the rain hood and the shape of the trough or recess 34 is complementary to the shape of the lower edge of the hood 14. In preferred embodiments, the top opening of the trough or recess 34 is sized such that the lower edge of the hood 14 can fit into the trough or recess and the gap between the lower part of the walls of the hood 14 and the sides of the opening of the trough or recess 34 is sufficiently small to prevent ingress of mosquitoes into the trough or recess 34.

The screen 16 is also provided with a peripheral flange 38. In the embodiment shown in the drawings, the peripheral flange 38 extends around the entirety of the frame 32. The peripheral flange 38 extends in a generally horizontal direction. The peripheral flange 38 is connected to the remainder of the frame by the U-shaped members 36.

Figure 4:
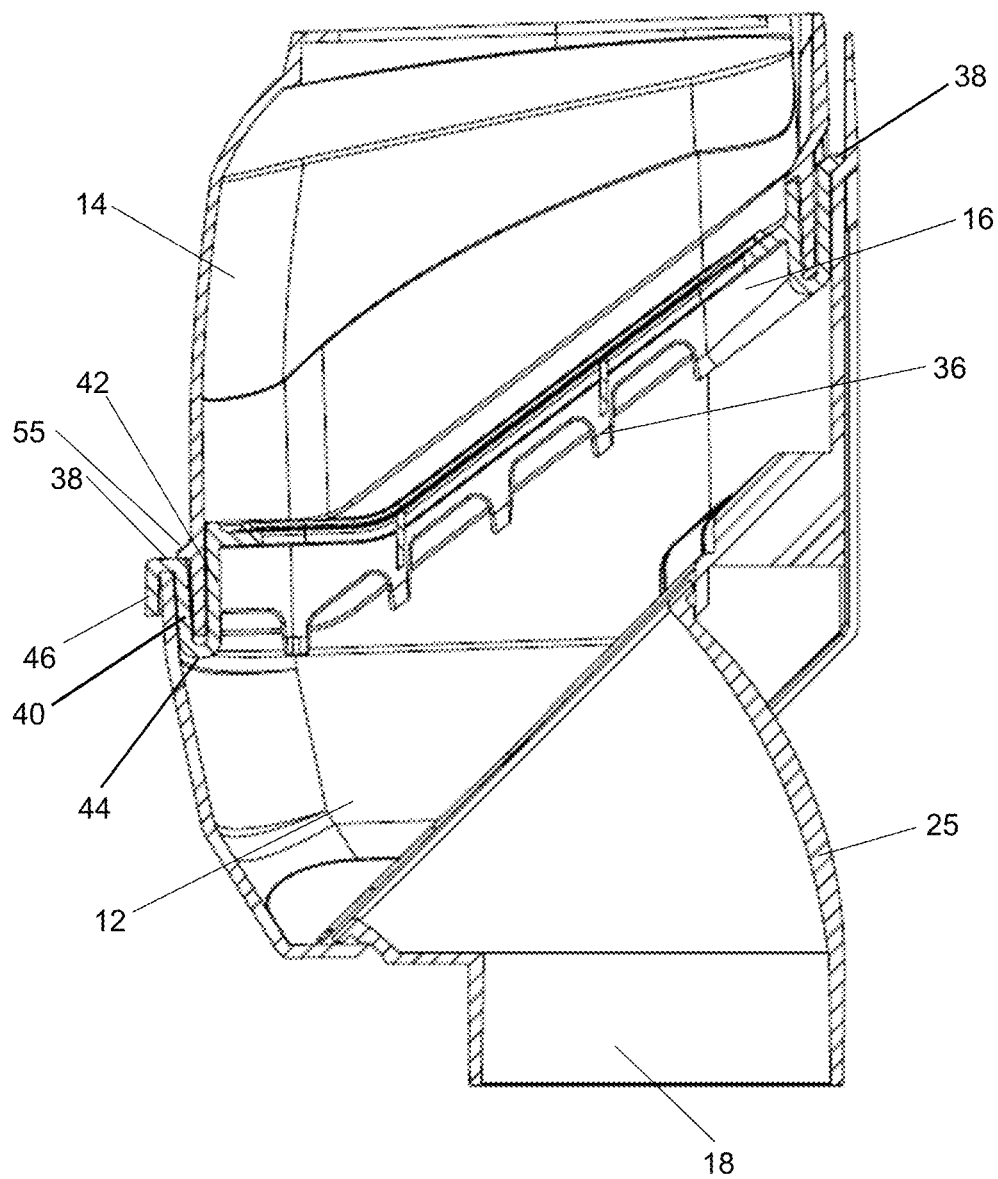
FIG. 4 shows a cross sectional side view of the rain head shown in FIG. 1.

As best shown in FIG. 4, the U-shaped members 36 include a downwardly extending wall or projection 40 that extends downwardly from an inner edge of the peripheral flange 38, and a spaced upwardly extending inner wall or projection 42 that is interconnected to the wall 40 by a bottom region 44. As also can be seen in FIG. 4, the lower edge of the hood 14 fits into the space between the walls 40 and 42.

The screen 16 also includes a downwardly extending lip 46 that extends downwardly from an outer part of the peripheral flange 38. As can this be seen from FIG. 7, downwardly extending lip 46 extends along the front part of the screen 16 and along a significant part of the opposed side parts of the screen 16. The downwardly extending lip 46 finishes at the region shown by reference numeral 48 in FIGS. 7 and 9, with this region being located slightly away from the rear edge of the screen 16.

As can be seen from FIG. 4, the downwardly extending lip 46 overlies the upper edges of the open top of the lower body 12 when the screen 16 is positioned on the lower body 12. In regions where the downwardly extending lip does not extend (such as in the rear part of the screen 16), the peripheral flange 38 rests on the lower body 12. However, as the downwardly extending lip 46 extends at least partly around 3 sides of the screen 16, the screen 16 is securely held in position on the lower body 12.

Figure 10:
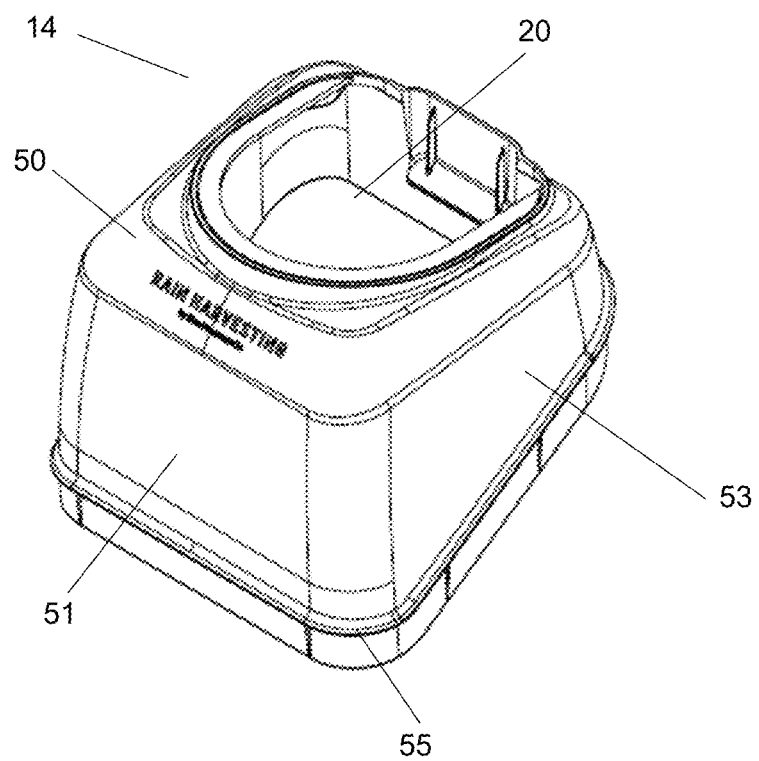
FIG. 10 shows a perspective view of the upper body used in the rain head shown in FIG. 1.
Figure 11:
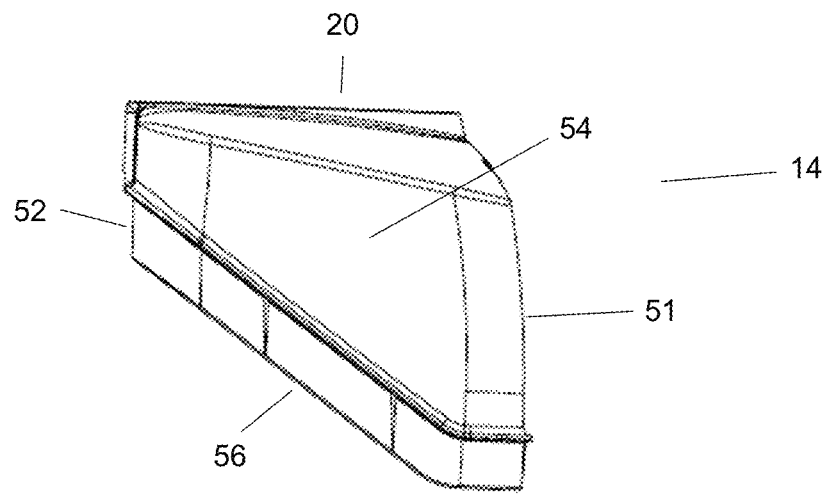
FIG. 11 shows a side view of the upper body shown in FIG. 9.
Figure 12:
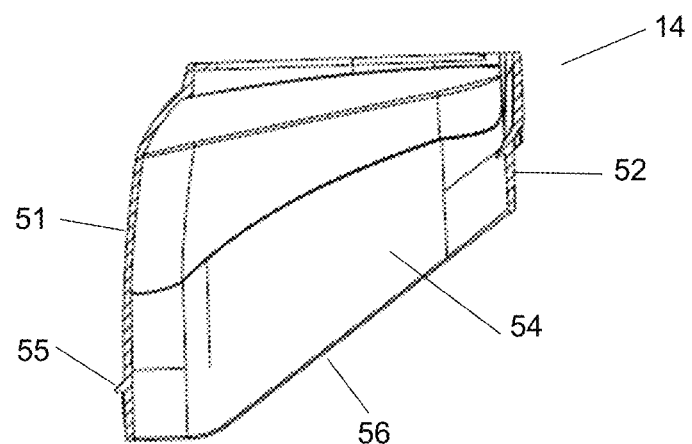
FIG. 12 shows a side cross-sectional view of the upper body shown in FIG. 9.
Figures 13, 14:
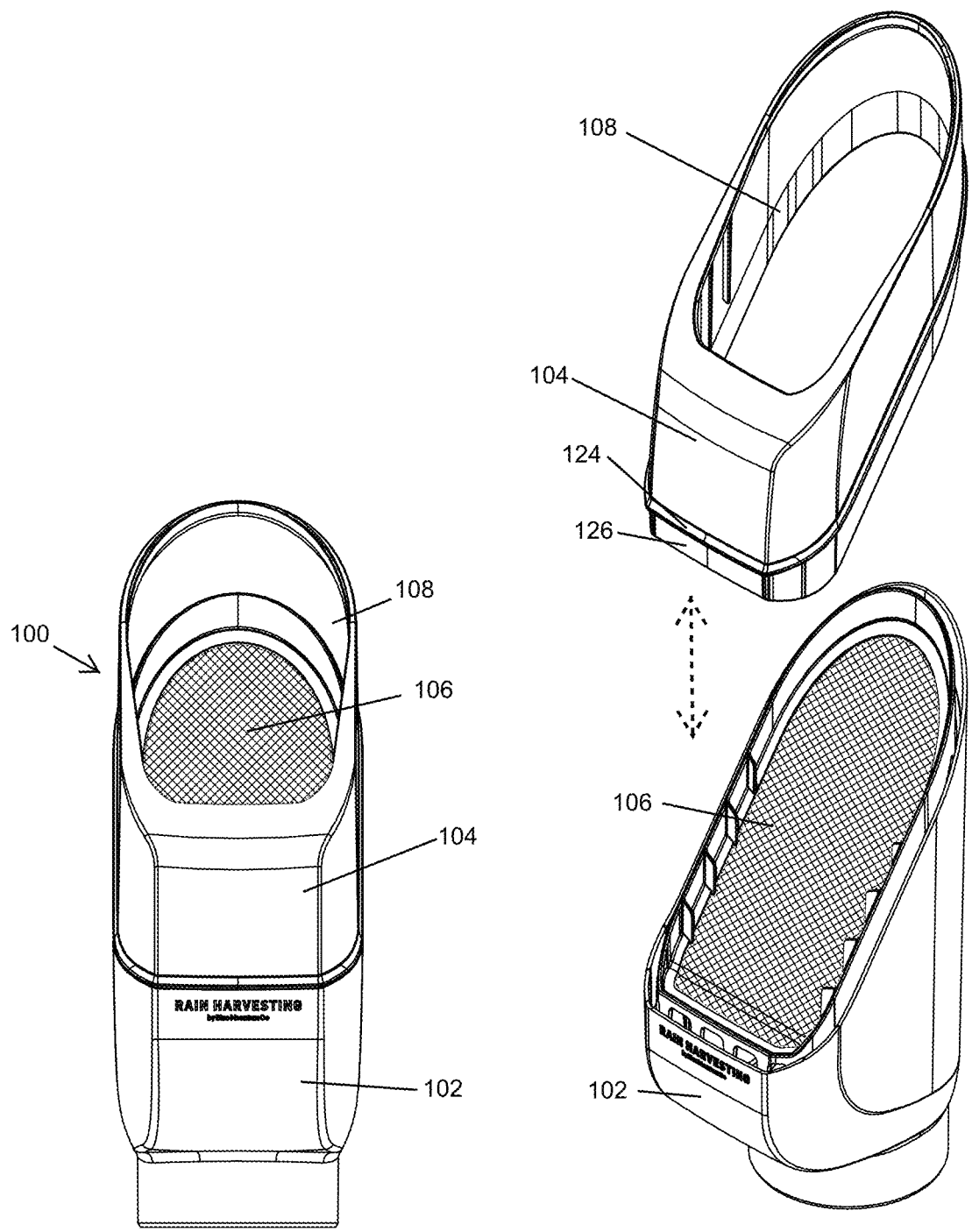
FIG. 13 shows a front view of a rain head in accordance with another embodiment of the present invention.
FIG. 14 shows the rain head of FIG. 13 with the upper body shown separate to the lower body and the screen.

FIGS. 10 to 12 show various views of the hood 14. The hood 14 has the top opening 20, a roof portion 50 and four sidewalls, being a front sidewall 51, a rear sidewall 52, and two opposed side sidewalls 53 and 54. A small outwardly extending projection 55 extends around the sidewalls of the hood 14. The projection 55 is located a distance above the lower edges of the hood 14 that corresponds to the depth of the trough or recess 34 of the screen 16. In this manner, when the hood 14 is located in the trough or recess 34 of the screen 16, the projection 55 acts as a cover over the space between the trough or recess 34 and the hood 14 to further assist in preventing ingress of mosquitoes into the rain head 10. The projection 55 also sets a limit to the depth at which the lower walls of the hood 14 can be inserted into the trough or recess 34.

The rear sidewall 52 of the hood 14 is shorter than the front sidewall 51 of the hood 14. As shown in FIGS. 11 and 12, the lower edges 56 of the sidewalls 53, 54 slopes downwardly from the rear sidewall 52 towards the front sidewall 51. Effectively, the bottom contour of the hood 14 follows the contour of the trough or recess 34 of the screen 16.

The hood 14 may suitably be manufactured by moulding from a plastic material. When the hood 14 is properly positioned in the rain head 10, the hood 14 provides an effectively closed upper surface (except, of course, for any gaps between the top opening 20 and the downpipe extending through the top opening 20). Consequently, any water that splashes off the screen 16 during a rain event will contact either the sidewalls or roof portion of the hood 14, which will prevent the water from escaping through the gap that would otherwise be present between the rain head and the upper downpipe. This water will then flow down the inner walls of the hood 14 and then flow through the openings in the trough or recess 34 of the screen 16 and thereafter into and through the lower body 12, ultimately exiting the lower body 12 through the outlet 18 of pipe 25. The rainwater can then be directed towards a rainwater storage tank.

FIGS. 13 to 16 show various views of a rain head in accordance with another embodiment of the present invention. The rain head 100 of FIGS. 13 to 16 includes a lower body 102, an upper body 104 and a screen 106. Compared to the embodiment shown in FIGS. 1 to 12, the rain head 100 of FIGS. 13 to 16 is relatively narrower. The lower body 102 of the rain head 100 has an open top and a lower opening through which water can pass, in a manner that is similar to the lower body of the rain head shown in FIGS. 1 to 12.

The upper body 104 is also in the form of a hood but having a significantly larger opening 108 than the hood shown in FIGS. 1 to 12. In this embodiment, a slightly greater loss of water from splashing may occur than with the embodiment shown in FIGS. 1 to 12. The upper body 104 may be considered to be a hood having an open roof.

FIGS. 15 and 16 show views of the lower body 102 with the screen 106 in the process of being fitted to the lower body (FIG. 15) and with the screen 106 being fitted to the lower body (FIG. 16). As can be seen from FIG. 15, the lower body 102 includes an inwardly extending projection or flange 110 that extends at least partly, or completely, around the inner walls of the lower body 102. As can be seen from FIG. 15, the inwardly extending projection or flange 110 is located a certain distance below the upper edge of the sidewalls of the lower body 102. In some embodiments, inwardly extending projection or flange 110 could be replaced by a plurality of inwardly extending ribs or tabs. The screen 106 has a frame 112. A plurality of downwardly extending legs, some of which are numbered at 114, form part of the frame 112 and support a lower edge 116 of the screen 106. The lower edge 116 includes an outwardly extending region. The lower edge 116 of the screen 106 sits on the inwardly extending projection or flange 110 when the screen 106 is fitted to the lower body 102. This supports and positions the screen relative to the lower body when the screen is fitted to the lower body.

As can be seen from FIG. 16, the outer wall or outer edge 118 of the frame 112 of the screen 106 is spaced from the inner wall 120 of the lower body 102 when the screen 106 is fitted to the lower body 102. This results in a space or gap 122 being formed between the screen 106 and the lower body 102. The upper body 104 has an outwardly extending flange or projection 124 (see FIG. 14) and a lower wall portion 126 that extends below the outwardly extending flange or projection 124. In use, the lower portion 126 fits into the gap or space 122 between the screen 106 and the lower body 102 to thereby enable the upper body 104 to be fitted to the lower body 102. The outwardly extending flange or projection 124 provides a stop member to facilitate positioning of the upper body 104 and also prevents mosquito ingress between the outer walls of the upper body 104 and the inner walls of the lower body 102. If the width of the gap or the space varies around the periphery due to manufacturing tolerance issues, the legs 114 have sufficient flex to enable the upper body to still be easily fitted to the lower body.

Figure 17:
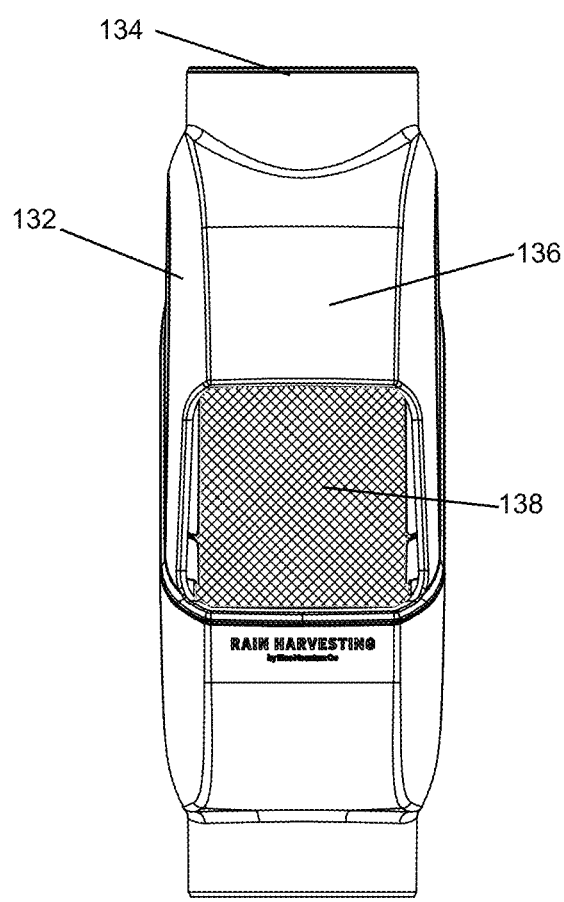
FIG. 17 shows a front view of the rain head in accordance with a further embodiment of the present invention.
Figure 18:
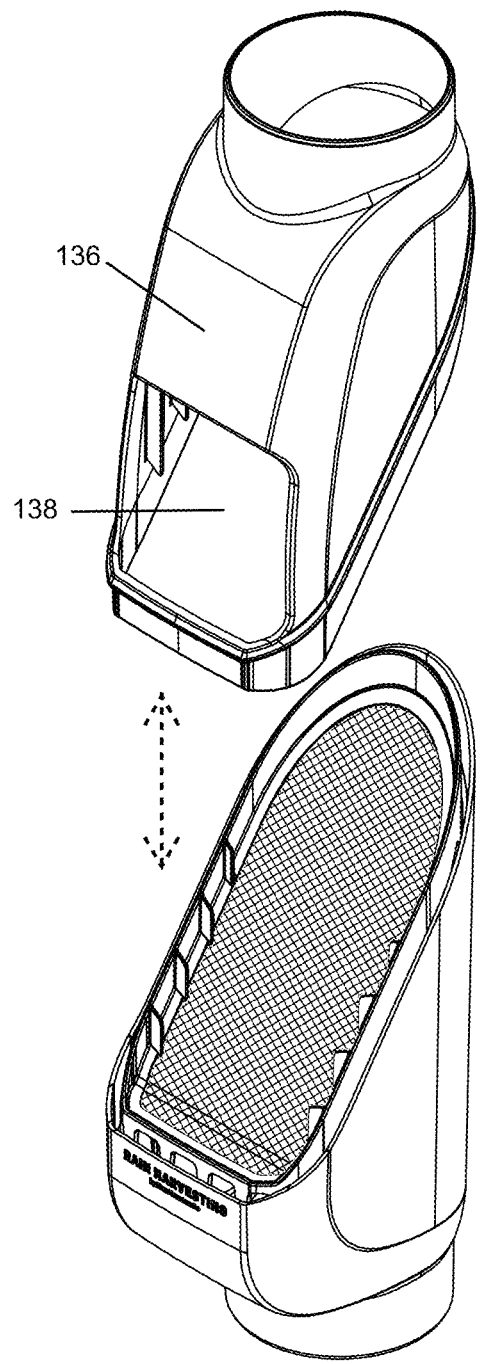
FIG. 18 shows the rain head of FIG. 17 with the upper body shown separate to the lower body and screen.

FIGS. 17 and 18 show a rain head having a similar arrangement to that shown in FIGS. 13 to 16. In particular, the screen and the lower body are essential identical to those as shown in FIGS. 13 to 16. For brevity, those features of FIGS. 17 and 18 will not be described further. However, the rain head 130 of FIGS. 17 and 18 has an upper body 132 that has an upper opening 134 that is sized to closely fit over an upper drainpipe. The front side wall 136 has an opening 138 located at a lower part thereof, with the opening 138 allowing for ready access to the screen so that leaves and other debris can be removed without requiring removal of the upper body 132. It will be appreciated that significantly greater water loss will occur through the opening 138 then in the embodiments shown in FIGS. 1 to 16. However, the embodiment shown in FIGS. 17 and 18 may be a useful in areas that have high leaf loadings that will require frequent clearing of the screen, whilst avoiding or lowering loss of water that splashes sideways off the screen. Fitting of the upper body 132 to the screen and lower body is essential identical to that as described with reference to FIGS. 13 to 16.

The rain head in accordance with embodiments of the present invention provides a rain head that can screen rainwater flowing from a guttering system. The hood can prevent or minimise or reduce loss of water that would otherwise be caused by splashing water from the screen. The hood is easy to install, and the screen is also easy to install. Both the hood and the screen can be removably mounted in the rain head. In order to clean or service the rain hood, the hood can simply be raised by sliding it up along the upper downpipe and any leaves collected on the screen can be removed, or the screen itself can be removed for cleaning. If the hood and/or screen need replacement, replacement is also a very simple matter. The screen and hood can be retrofitted to existing rain heads and it is envisaged that, in a possible commercial embodiment, the screen and the hood will be sold as an upgrade kit or a retrofit kit.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A rain head comprising:
    a lower body including an upper open end with an upper edge sloping downwardly from a rear side wall towards a front side wall, and an outlet passage at a lower end of the lower body;
    a detachable screen including a mesh or a strainer surrounded by a frame having a peripheral flange with a downwardly extending outer lip extending at least part way around the peripheral flange for detachable engagement with the upper edge of the lower body, and a trough, recess or slot being formed in the frame; and
    a detachable hood including a top opening and an opening in a bottom part, a lower edge of the bottom part of the detachable hood being sized and shaped to be received in the trough, recess or slot, to thereby detachably attach the detachable hood to the detachable screen and the lower body.

2. The rain head as claimed in claim 1, wherein the trough, recess or slot extends around and encircles the detachable screen.

3. The rain head as claimed in claim 1, wherein the trough, recess or slot has openings, in a lower part thereof to enable water to flow or drain therethrough.

4. The rain head as claimed in claim 3, wherein the trough, recess or slot is defined by a plurality of spaced U-shaped projections and the space between adjacent U-shaped projections defines the openings allowing water to drain therethrough.

5. The rain head as claimed in claim 1, wherein the lower body has one or more internal ribs to provide additional strength to the lower body.

6. The rain head as claimed in claim 1, wherein the detachable screen comprises a steel mesh or a stainless steel mesh.

7. The rain head as claimed in claim 1, wherein the detachable screen comprises an embedded piece of plastic mesh material.

8. The rain head as claimed in claim 1, wherein the detachable screen has apertures sized to prevent mosquitos from passing therethrough.

* * * * *